Dec. 14, 1965    J. A. MELANDER    3,223,125
DEVICE FOR FORMING ANNULAR BODY
Filed March 8, 1961    3 Sheets-Sheet 1

INVENTOR
Jack A. Melander

BY
Stevens, Davis, Miller & Mosher
ATTORNEYS

Dec. 14, 1965  J. A. MELANDER  3,223,125
DEVICE FOR FORMING ANNULAR BODY
Filed March 8, 1961  3 Sheets-Sheet 2

INVENTOR
Jack A. Melander
BY Stevens, Davis, Miller & Mosher
ATTORNEYS

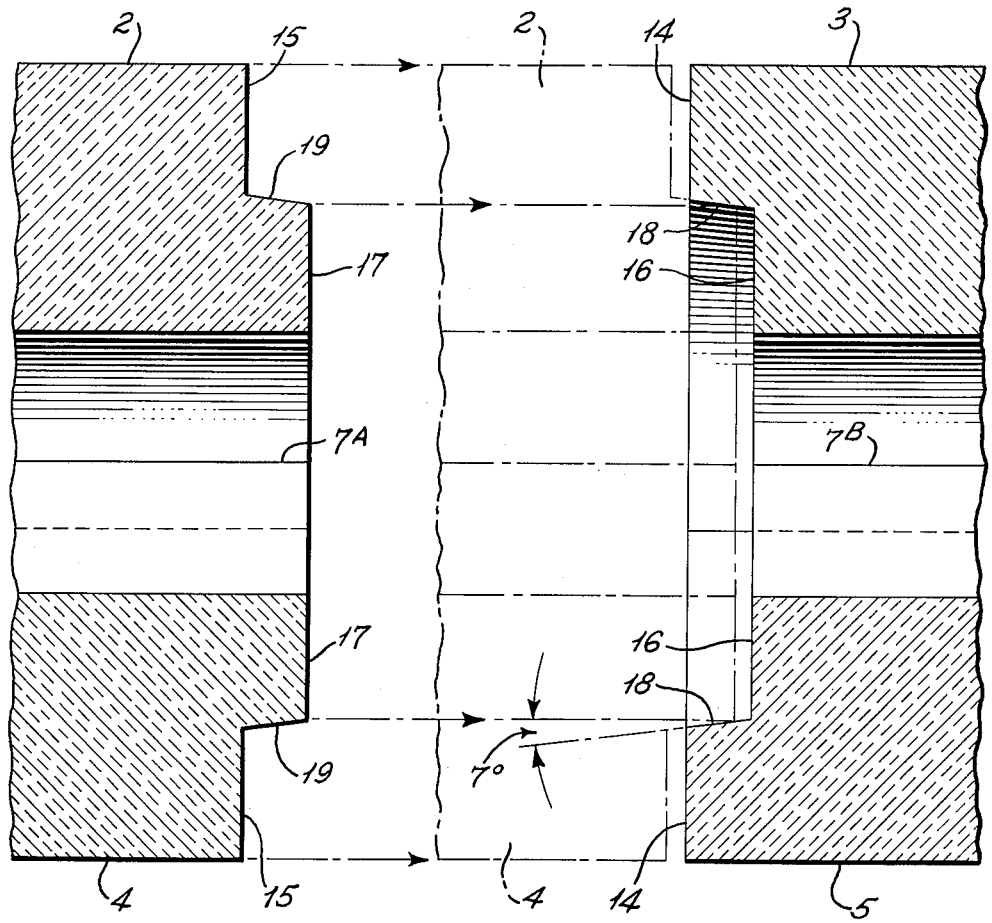

United States Patent Office 3,223,125
Patented Dec. 14, 1965

3,223,125
DEVICE FOR FORMING ANNULAR BODY
Jack A. Melander, Ballston Spa, N.Y.
Filed Mar. 8, 1961, Ser. No. 94,376
5 Claims. (Cl. 138—157)

This invention relates to devices for forming annular bodies of pre-formed sections and more specifically to pipe insulation which is pre-formed in sections and applied by joining the sections about the pipe.

For many years pipe insulation has been formed in situ by wrapping, binding, clamping or otherwise attaching uniformed or partially pre-formed insulating material around the pipe. All of the known techniques for insulating pipes manifest certain disadvantages and difficulties. They are initially expensive because of the labor and skill required to apply the insulation. They involve great trouble and expense to maintain because when such pipe insulation must be removed it is, for most purposes, ruined and must be replaced with new material which must be applied by the same tedious and expensive process. There are also disadvantages to the effectiveness of such pipe insulation, such as the highly heat conductive caulking materials necessary to form a vapor barrier. Also where partially pre-formed sections are used, a tight mechanical seal between joining surfaces cannot be achieved without a considerable amount of additional labor and equipment.

It is therefore an important object of this invention to provide pre-formed pipe insulation which will require very little labor and skill to apply, which will require no tools or special equipment to apply, and which will require no additional equipment in the nature of binding or clamping devices.

It is a further object of this invention to provide pre-formed pipe insulation which is simple to maintain and can be removed and reapplied without damage to the insulation material and with a minimum of time, trouble and labor.

According to this invention there is provided an easily applied and maintained pipe insulation in pre-formed sections which form tight mechanical seals between the joining surfaces of the sections and which has superior insulating qualities through eliminating the use of heat conducting caulking materials.

Further objects and advantages will become apparent from the following detailed description of a preferred embodiment of the present invention, reference being had to the accompanying drawings forming part hereof in which like numerals refer to like parts.

In the drawings:

FIG. 4 is a sectional view of two annular sections of the pipe insulation with phantom lines indicating the movement of one section into joining position with the other.

Figure 1:
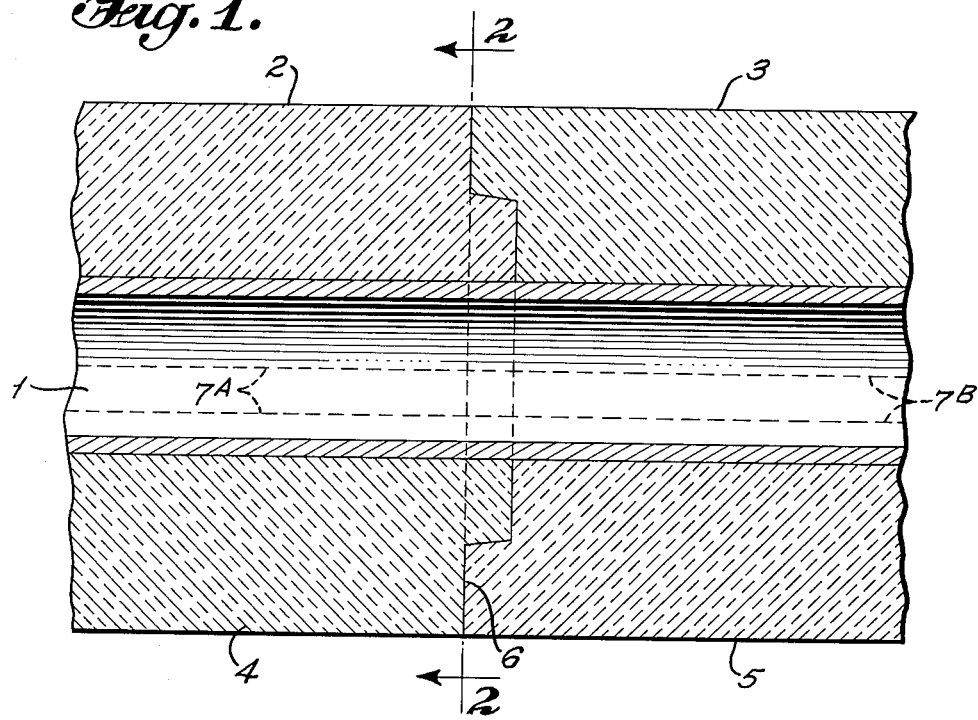
FIG. 1 is a view in vertical section of pipe insulation according to the present invention assembled in pipe enveloping position.
Figure 2:
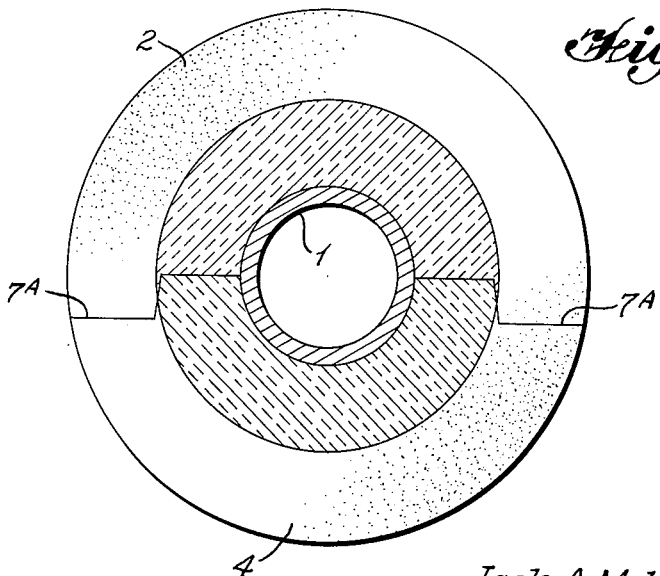
FIG. 2 is a sectional view taken on the line 2—2 of FIG. 1.

Referring to the drawings, the insulation material is shown in FIGS. 1 and 2 in application to the pipe 1. The insulation material comprises four sections indicated by the reference numerals 2, 3, 4 and 5. Section 2 is joined to section 4 at the radial joint 7A. Section 3 is joined to section 5 at the radial joint 7B. The combined sections 2 and 4 are joined to the combined sections 3 and 5 at the axial joint 6. The axial joint 6, as shown in FIG. 1 and the radial joint 7A as shown in FIG. 2, involve the same principle which utilizes the frictional and resilient characteristics of certain insulation materials such as expanded polystyrene and rigid urethane. The insulation materials which function best have the rigidity to resist deformation and yet also have some degree of resiliency. These characteristics are definable in terms of a compressive yield strength between 15 and 40 pounds per square inch and a flexural strength of 45 to 125 pounds per square inch. The modulus of rigidity is within 1000 to 1500 pounds per square inch. It is also preferable that the surface be rough and granular so as to offer a degree of frictional resistance; yet, due to the aforementioned degree of resiliency the friction will not abrade the surfaces and change their dimensions.

Figure 3:
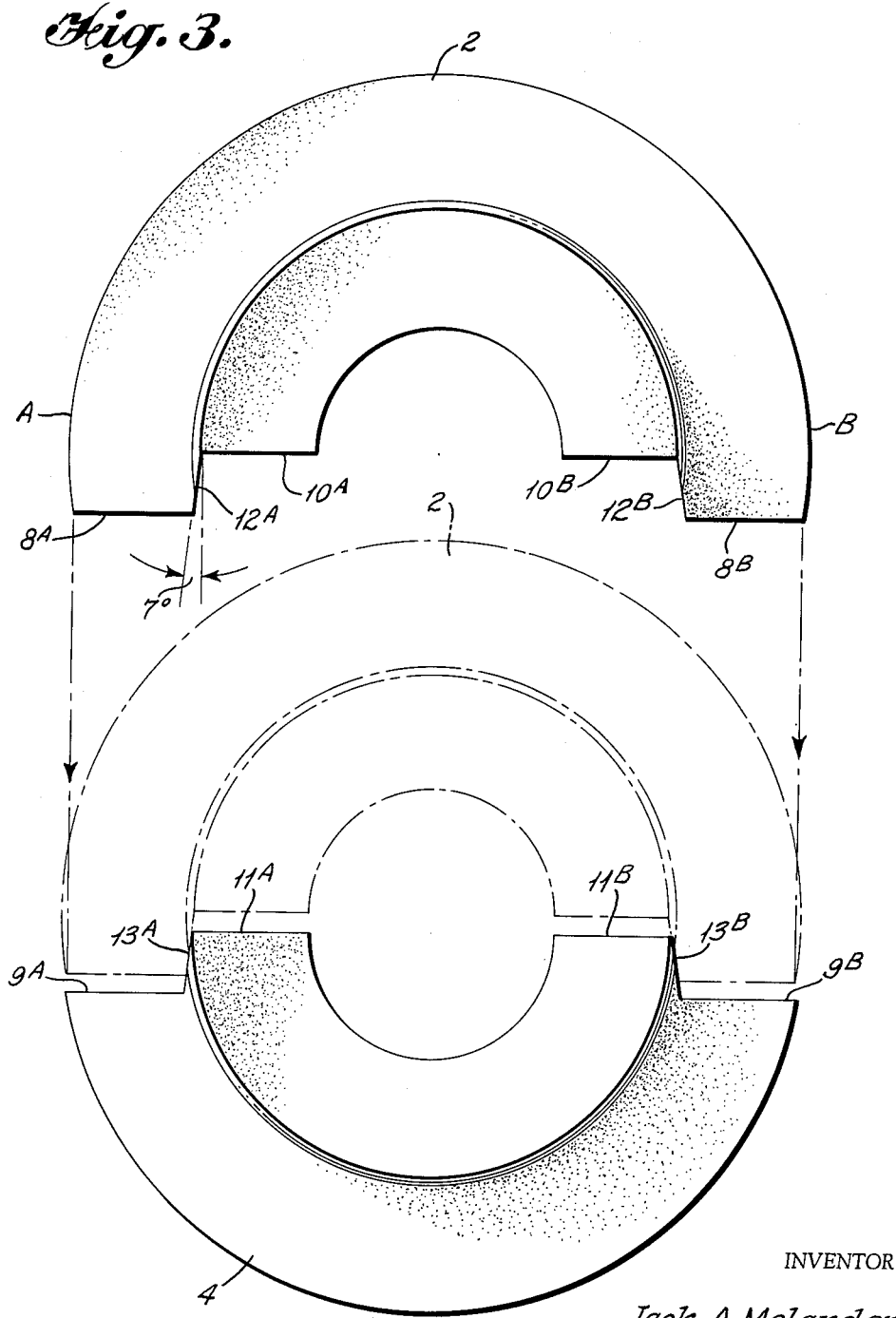
FIG. 3 is an end elevational view of two longitudinal sections of the pipe insulation with phantom lines indicating the movement of one section into joining position with the other.

Referring to FIG. 3 where the radial joint 7A is shown in detail, it will be noted that sections 2 and 4 are supplementary halves of an annular body. The joining area of section 2 has parallel surfaces 8A, 8B, 10A and 10B. Surfaces 8A and 8B are on one plane and surfaces 10A and 10B are on a recessed plane. Surfaces 8A and 8B are off-set from surfaces 10A and 10B at a slightly oblique angle forming off-set sections defining surfaces 12A and 12B. The joining area of section 4 has parallel surfaces 9A, 9B, 11A and 11B. Surfaces 11A and 11B are on one plane and surfaces 9A and 9B are on a recessed plane. Surfaces 11A and 11B are off-set from surfaces 9A and 9B at a slightly oblique angle, forming off-set sections defining surfaces 13A and 13B. The corresponding joining surfaces of sections 2 and 4 are of the same width; specifically, sections 8A and 9A are of the same width, sections 8B and 9B are of the same width, sections 10A and 11A are of the same width, sections 10B and 11B are of the same width, sections 12A and 13A are of the same width, and sections 12B and 13B are of the same width. The corresponding off-set surfaces, 12A, 12B, 13A, and 13B are at complementally acute angles of approximately 7 degrees.

It will be further noted from reference to FIG. 3 the corresponding surfaces of sections 2 and 4 are not in perfect registry when apart, as shown. Specifically, the side A of section 2 is nearer to the side B of section 2 than are the corresponding sides of section 4.

In application, the sections 2 and 4 are brought together around a pipe of appropriate size forming an annular body enclosing the pipe. The aforementioned difference in registry has a wedging effect and as the two sections are forced together the sides of section 2 are slightly extended and the sides of section 4 are slightly compressed. The resilient characteristics of the insulating material and the frictional quality of its surfaces retain the two sections securely in an interference fit forming an annular body. In addition, the off-set of the joining surfaces forms a sound mechanical seal, requiring no additional insulation or caulking. The application of the insulation material to the pipe and the forming of the annular body requires no more than slight manual pressure and no clamps or other equipment are required to secure it. Likewise, the two sections can be disengaged manually with the same ease and without damage to the material or the joining surfaces of the sections.

Referring to FIG. 4, it will be noted that the axial joint involves the same principle as the radial joint. The combined sections 2 and 4 form an annular body 2-4. The combined sections 3 and 5 form an annular body 3-5. The joining area of body 3-5 has parallel annular surfaces 14 and 16, surface 16 being on a recessed plane. Surface 14 is off-set from surface 16 at a slightly oblique angle forming an off-set section defining surface 18. The joining area of body 2-4 has parallel annular surfaces 15 and 17, surface 15 being on a recessed plane. Surface 17 is off-set from surface 15 at a slightly oblique angle forming an off-set section defining surface 19. The corresponding joining surfaces of bodies 3–5 and 2–4 are of the same width; specifically, surfaces 14 and 15 are of the same width, surfaces 16 and 17 are of the same width, and surfaces 18 and 19 are of the same width. The corresponding off-set surfaces 18 and 19 are at complementally oblique angles of approximately 7 degrees.

The surfaces of annular body 3–5 and the corresponding surfaces of annular body 2–4 are not in perfect registry, the inner periphery of surface 14 being slightly less than the inner periphery of surface 15.

In forming the axial joint 6, the annular bodies 3–5 and 2–4 are brought together and with a slight wedging effect, forced into a secure interference fit joint in the same manner as the radial joint 7.

The sections 2, 3, 4 and 5 can be pre-formed to various sizes to provide for different pipe thicknesses and lengths. Likewise, special sections can be formed to provide for angular joints, sleeves and other such irregularities in the size and shape of the pipe.

It will be understood that while the preferred embodiment described herein is referred to as pipe insulation that an annular body made according to this invention could have numerous other uses.

It also will be understood that various modifications within the spirit of the invention may occur to those skilled in the art. Therefore it is intended that no limitations be placed on the invention except as defined by the scope of the appended claims.

What is claimed is:

1. A preformed pipe insulation annular body of rigid foamed synthetic organic plastic material, said body comprising at least two sections abutting in two plane surfaces which are substantially parallel to each other but mutually offset, complementary abutting surfaces extending between said substantially parallel surfaces at an angle of about five to nine degrees, whereby upon engagement of said sections the material at said abutting surfaces is slightly stressed in compression and the resiliency and frictional qualities thereof retain the sections securely in an interference fit, said plastic material being a resin having a modulus of rigidity between 1000 and 1500 pounds per square inch and a flexural strength between 15 and 40 pounds per square inch.

2. An annular insulating body as set forth in claim 1 in which the resin is expanded polystyrene.

3. An annular insulating body as set forth in claim 1 in which the resin is rigid urethane.

4. An annular insulating body as set forth in claim 1 in which the abutting surfaces of the sections are rough and granular.

5. An annular insulating body as set forth in claim 1 in which an end of each section is formed with two parallel plane surfaces normal to the longitudinal axis of said section and an inclined surface between said parallel surfaces whereby said sections may be engaged with complementary surfaces on the ends of an abutting pair of like sections.

References Cited by the Examiner

UNITED STATES PATENTS

| 926,423 | 6/1909 | Kelly | 154—44 |
| 1,320,313 | 10/1919 | Case | 138—157 X |
| 2,602,764 | 7/1952 | Billingham | 154—44 |
| 2,650,180 | 8/1953 | Walker | 154—44 |
| 2,780,090 | 2/1957 | Rasmussen. | |

FOREIGN PATENTS

| 2,212 | 1896 | Great Britain. |
| 851,585 | 10/1960 | Great Britain. |

LAVERNE D. GEIGER, *Primary Examiner.*

CARL F. KRAFFT, MORRIS SUSSMAN, LEWIS J. LENNY, EDWARD V. BENHAM, *Examiners.*